(12) United States Patent
Voss

(10) Patent No.: US 8,231,104 B2
(45) Date of Patent: Jul. 31, 2012

(54) SOLENOID VALVE

(75) Inventor: Christoph Voss, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 940 days.

(21) Appl. No.: 12/293,474

(22) PCT Filed: Mar. 14, 2007

(86) PCT No.: PCT/EP2007/052387
§ 371 (c)(1),
(2), (4) Date: Sep. 18, 2008

(87) PCT Pub. No.: WO2007/107486
PCT Pub. Date: Sep. 27, 2007

(65) Prior Publication Data
US 2009/0278067 A1    Nov. 12, 2009

(30) Foreign Application Priority Data

Mar. 21, 2006  (DE) .......................... 10 2006 012 805
Apr. 27, 2006  (DE) .......................... 10 2006 019 464

(51) Int. Cl.
*F16K 31/02* (2006.01)
(52) U.S. Cl. .............................. 251/129.15; 251/129.16
(58) Field of Classification Search ............. 251/129.01, 251/129.15, 129.16, 129.14; 335/279
See application file for complete search history.

(56) References Cited

U.S. PATENT DOCUMENTS

| 3,738,578 | A | * | 6/1973 | Farrell | 239/585.4 |
| 3,861,644 | A | * | 1/1975 | Knape | 251/129.14 |
| 5,114,077 | A | * | 5/1992 | Cerny | 239/483 |
| 5,211,341 | A | * | 5/1993 | Wieczorek | 239/585.3 |
| 5,603,482 | A | * | 2/1997 | Mott et al. | 251/129.2 |
| 5,810,330 | A | * | 9/1998 | Eith et al. | 251/129.19 |
| 6,220,569 | B1 | * | 4/2001 | Kelly | 251/129.08 |
| 6,619,617 | B2 | * | 9/2003 | Ricco et al. | 251/129.16 |
| 6,722,628 | B1 | * | 4/2004 | Seil | 251/129.15 |
| 6,742,764 | B1 | * | 6/2004 | Volz | 251/129.02 |
| 6,778,051 | B2 | * | 8/2004 | Shirase et al. | 335/278 |
| 6,994,406 | B1 | * | 2/2006 | Krawczyk et al. | 303/119.2 |
| 7,195,027 | B2 | | 3/2007 | Goossens et al. | |
| 2003/0020039 | A1 | * | 1/2003 | Haeberer et al. | 251/129.16 |

FOREIGN PATENT DOCUMENTS

| DE | 36 20 239 A1 | 12/1987 |
| DE | 3802648 A1 | 8/1989 |
| DE | 40 13 425 C1 | 6/1991 |
| DE | 40 23 660 A1 | 1/1992 |
| DE | 197 38 633 A1 | 3/1998 |
| DE | 102 54 342 A1 | 11/2003 |
| EP | 0 728 971 A1 | 8/1996 |
| EP | 1350999 A1 * | 10/2003 |

OTHER PUBLICATIONS

Machine Translation of EP 1350999 (from EPO website; Aug. 1, 2011).*

* cited by examiner

*Primary Examiner* — John Fristoe, Jr.
*Assistant Examiner* — Jessica Cahill
(74) *Attorney, Agent, or Firm* — RatnerPrestia

(57) ABSTRACT

The invention relates to a solenoid valve including a valve housing. A valve seat sleeve is fixed in the valve housing and defines a valve seat. A magnet armature defining a blind hole with a valve closing element positioned therein is movably positioned relative to the valve seat sleeve with the valve seat positioned in and engaging the blind hole such that the valve closing element is aligned with the valve seat.

13 Claims, 1 Drawing Sheet

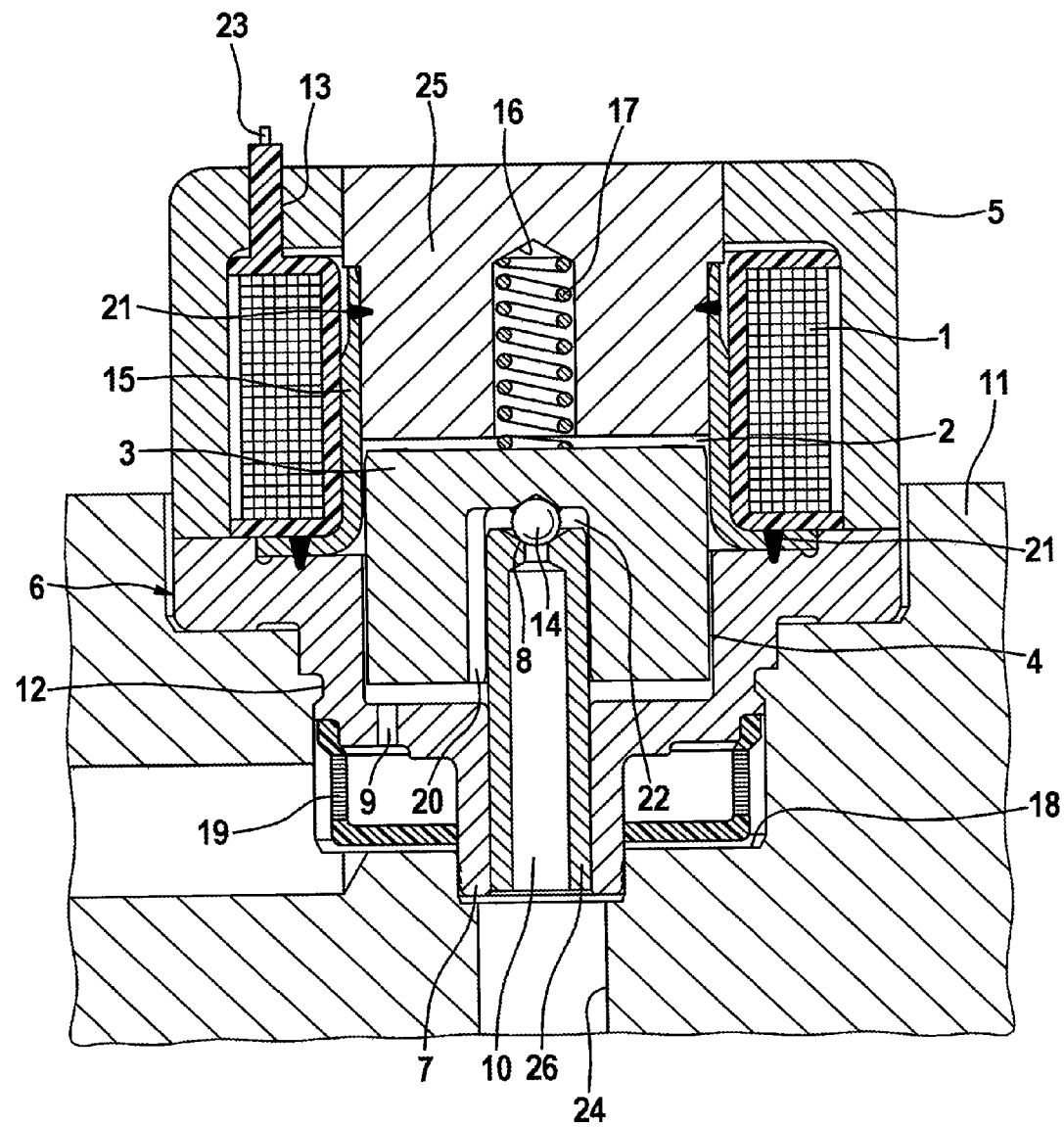

SOLENOID VALVE

CROSS-REFERENCE TO RELATED APPLICATIONS

This application is the U.S. national phase application of PCT International Application No. PCT/EP2007/052387, filed Mar. 14, 2007, which claims priority-to German Patent Application No. DE102006012805.2, filed Mar. 21, 2006 and German Patent Application No. DE102006019464.0, filed Apr. 27, 2006, the contents of such applications being incorporated by reference herein in their entirety.

BACKGROUND OF THE INVENTION

1. Field of the Invention

The invention relates to a solenoid valve.

2. Description of the Related Art

DE 102 54 342 A1 already discloses a solenoid valve of this type whose valve housing accommodates a valve closing element which interacts with a magnet armature and is directed toward a valve seat in the valve housing. A magnet coil which is arranged outside a sleeve-like valve housing section is provided to operate the magnet armature. A centering body, which the valve closing element enters, is arranged in an articulated manner on a valve seat sleeve in order to precisely orient the valve closing element in relation to the valve seat.

The arrangement of a centering body on the valve seat sleeve constitutes an additional construction cost. In addition, this increases the overall height of the solenoid valve and the magnet armature also has to be conducted along its outer casing in the valve housing taking into account unfavorable friction conditions.

SUMMARY OF THE INVENTION

An object of the present invention is to improve a solenoid valve of the specified type in such a way that the abovementioned disadvantages do not occur.

According to an aspect of the invention, this object is achieved for a solenoid valve which includes a valve housing, a valve seat sleeve fixed in the valve housing, and a valve seat defined on the valve seat sleeve. A magnet armature defines a blind hole for at least partially accommodating the valve seat sleeve such that the armature is movably positioned and centered over the valve seat sleeve. A valve closing element is either coupled to or extends from a surface of the magnet armature. The valve closing element is configured for sealing engagement with the valve seat. A magnet coil is configured to selectively translate the magnet armature between distal and proximal positions with respect to the valve seat. In an open position of the solenoid valve, the magnet armature is oriented in the distal position thereby permitting a flow of fluid through the solenoid valve. In a closed position of the solenoid valve, the magnet armature is oriented in the proximal position thereby limiting the flow of fluid through the solenoid valve.

These and other aspects of the invention are illustrated in detail by way of the embodiments and are described with respect to the embodiments in the following, making reference to the FIGURE.

BRIEF DESCRIPTION OF THE DRAWINGS

The invention is best understood from the following detailed description when read in connection with the accompanying drawing. Included in the drawing are the following figures:

FIG. 1 is a cross-sectional view of a solenoid valve in accordance with an exemplary embodiment of the invention.

DETAILED DESCRIPTION OF THE PREFERRED EMBODIMENTS

FIG. 1 shows a solenoid valve which is depicted in longitudinal section, is designed as a 2/2-way seat valve and has a valve housing 6 which is designed as a cartridge and accommodates a valve closing element 14 which can be operated by a magnet armature 3 and is concentrically directed at a valve seat 8 in the valve housing 6.

A magnet coil 1 is arranged on the outside of the thin-walled sleeve section 15 of the valve housing 6 in order to operate the magnet armature 3, said magnet coil being surrounded by a yoke plate 5 which conducts the magnetic flux. The sleeve section 15 of the valve housing 6, which sleeve section does not conduct the magnetic flux, is closed by a magnet core 25, with a weld seam 21 establishing a permanent connection between the sleeve section 15 and the magnet core 25. A further weld seam 21 ensures the requisite connection between the non-magnetic sleeve section 15 and the valve cartridge which conducts the magnetic flux.

There is an axial gap 2 between the magnet core 25 and the magnet armature 3, said axial gap, like a radial gap 4 which is provided between a lateral surface of the magnet armature 3 and the valve housing 6, being bridged during electromagnetic excitation by magnetic field lines.

The lower part of the valve housing 6, which lower part conducts the magnetic flux, forms the valve cartridge on whose upper face the magnetic yoke plate 5 rests. The lower region of the valve cartridge accommodates the pressure medium duct 9 and the valve seat sleeve 26 which is provided with the further pressure medium duct 10. The yoke plate 5 is correspondingly matched to the magnet coil contour in order to accommodate the magnet coil 1.

In order to supply electrical energy to the magnet coil 1, the yoke plate 5 which accommodates the magnet coil 1 is provided with a passage opening 13 through which an electrical contact 23 which is connected to the magnet coil 1 is conducted in a liquid-tight manner.

In order to make the magnetic force effect on the magnet armature 3 as effective as possible and to keep the overall height of the solenoid valve as low as possible, the magnet armature 3 has a height-to-width ratio which is equal to or less than 1, so that, in practice, the height of the magnet armature 3 cannot exceed the outside diameter of the magnet armature 3.

In order to permit production which is as cost-effective as possible, the yoke plate 5 and the sleeve section 15 are formed as deep-drawn parts, and the magnet armature 3 and the magnet core 25 are formed as cold-formed or extruded parts. The valve cartridge is also produced as a cold-formed part from a tubular blank whose outer contour has a housing stage with an annular groove 12 into which the material of the valve block 11, which is softer than the valve cartridge, is plastically displaced in order to fix and seal the valve housing 6 in the valve block 11.

Furthermore, the depicted solenoid valve has a filter element 19 which is arranged on the lower projection 7, which is stepped in the manner of a peg, of the valve cartridge and is designed as an annular filter element and prevents dirt from entering the pressure medium duct 9 which is generally calibrated. In order to reduce the overall height of the valve, the pressure medium duct 9 is formed in an intermediate base above the valve housing 6, which is stepped in the manner of a peg, directly parallel to the pressure medium duct 10, the diameter of the lower peg-like end of said intermediate base being reduced in size to such an extent that it extends in a sealing manner into a duct hole (valve connection 24) with a relatively low press-in force on the base of the valve accommodation hole 18.

The solenoid valve which is closed in the basic position in FIG. 1 has a blind hole 16 in the magnet core 25, in which blind hole a compression spring 17 which extends to the magnet armature 3 is inserted. That end face of the magnet armature 3 which is averted from the compression spring 17 is provided with a blind hole 22 in which the spherical valve closing element 14 which is pressed onto the funnel-like valve seat 8 under the action of the compression spring 17 is also accommodated. The valve seat 8 is arranged at the upper end of the valve seat sleeve 26 which is pressed-in in the valve housing 6 and extends into the magnet armature 3 over virtually the entire depth of the blind hole 22. The magnet armature 3 is therefore conducted in a simple and particularly compact manner precisely along the valve seat sleeve 26 and as a result is also correspondingly centered, so that complex external centering of the magnet armature 3 along the valve housing wall can be dispensed with.

The valve closing element 14 is securely fixed to the base of the blind hole 22 in the magnet armature 3 in a simple manner such that it is recessed in the center by means of capacitor-discharge welding. In order to precisely center the valve closing element 14 in relation to the valve seat 8, the valve seat sleeve 26 extends with little play into the blind hole 22, so that the magnet armature 3 is internally centered with a low level of friction on the valve seat sleeve 26. The lateral surface of the blind hole 22 has a longitudinal groove 20, so that a low-resistance hydraulic connection which has a sufficiently large cross section is ensured between the two valve connections in the valve block 11 in the position of the valve in which it is electromagnetically opened.

The desired sealing and fixing effect of the peg-like projection 7 in the duct hole (vertical valve connection) is assisted by the design as a sawtooth or fir-cone-like contour on the tubular projection 7. As an alternative, a plurality of channels on the circumference of the projection 7 can also ensure the required fixing and sealing effect.

The presented solenoid valve is preferably used in a slip-controlled motor vehicle brake system, for which reason the valve block 11, of which only sections are depicted, has a large number of valve accommodation holes 18 which are made in the valve block 11 in a plurality of rows in order to accommodate the solenoid valve which is opened without power. This provides a particularly compact braking device whose valve block 11 is of very flat construction overall on account of the low overall height of the depicted solenoid valves. In conjunction with a further solenoid valve which is arranged downstream of each wheel brake, a suitable control electronics system can control the increase or reduction in braking pressure in the wheel brake in the event of slip control.

To summarize, the proposed features provide a particularly small solenoid valve with low-friction centering of the magnet armature 3 on a valve seat sleeve 26 which is particularly precise compared to the valves known to date, as a result of which the valve closing element 14 is also necessarily always oriented exactly in relation to the valve seat 8.

As shown in FIG. 1, all the cited components are oriented in a rotationally symmetrical manner in relation to the longitudinal axis of the valve, this aiding production and assembly of the components by machine.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A solenoid valve comprising:
   a valve housing;
   a valve seat sleeve fixed in the valve housing and defining a valve seat, the valve seat sleeve having an outer surface extending in an axial direction; and
   a magnet armature defining a blind hole with a valve closing element positioned therein, the blind hole having a lateral surface extending in the axial direction, the magnet armature movably positioned relative to the valve seat sleeve with the valve seat positioned in and engaging the blind hole such that the valve closing element is aligned with the valve seat and the outer surface of the valve seat sleeve at least partially contacts the lateral surface of the blind hole when the solenoid valve is in an open position.

2. The solenoid valve as claimed in claim 1, wherein at least a portion of the valve housing includes a tubular projection that is sized for insertion into a valve accommodation hole of a valve block.

3. The solenoid valve as claimed in claim 1 further comprising a compression spring positioned to bear on the magnet armature and bias the valve closing element in a direction towards the valve seat.

4. The solenoid valve as claimed in claim 1, wherein an outside diameter dimension of the magnet armature is greater than or equal to a height dimension of the magnet armature.

5. The solenoid valve as claimed in claim 1, wherein the valve closing element includes a spherical surface for engaging the valve seat.

6. The solenoid valve as claimed in claim 1, wherein the valve closing element is fixed to a base surface of the blind hole by a weld.

7. The solenoid valve as claimed in claim 1, wherein the outer surface of the valve seat sleeve at least partially contacts the lateral surface of the blind hole when the solenoid valve is in a fully open position.

8. The solenoid valve as claimed in claim 1, wherein a fluid passageway extends between a first fluid duct defined in the valve seat sleeve and a second fluid duct defined in the valve housing.

9. The solenoid valve as claimed in claim 8, wherein the fluid passageway includes a groove defined on the lateral surface of the blind hole.

10. The solenoid valve as claimed in claim 1 further comprising:
    a magnet coil configured to selectively translate the magnet armature between distal and proximal positions with respect to the valve seat,
    wherein in an open position of the solenoid valve the magnet armature is oriented in the distal position thereby permitting a flow of fluid through the solenoid valve, and in a closed position of the solenoid valve the magnet armature is oriented in the proximal position and thereby limiting the flow of fluid through the solenoid valve.

11. The solenoid valve as claimed in claim 10, further comprising a sleeve member positioned between the magnet coil and the magnet armature.

12. The solenoid valve as claimed in claim 11, wherein the magnet armature and a magnet core are cold-formed parts or extruded parts and the sleeve section is a deep-drawn part.

13. The solenoid valve as claimed in claim 11, wherein the valve housing is connected to or integral with the sleeve member.

* * * * *